No. 674,962.  
P. R. CUMMING.  
WINDOW CLEANER.  
(Application filed Aug. 17, 1899.)  
Patented May 28, 1901.
(No Model.)
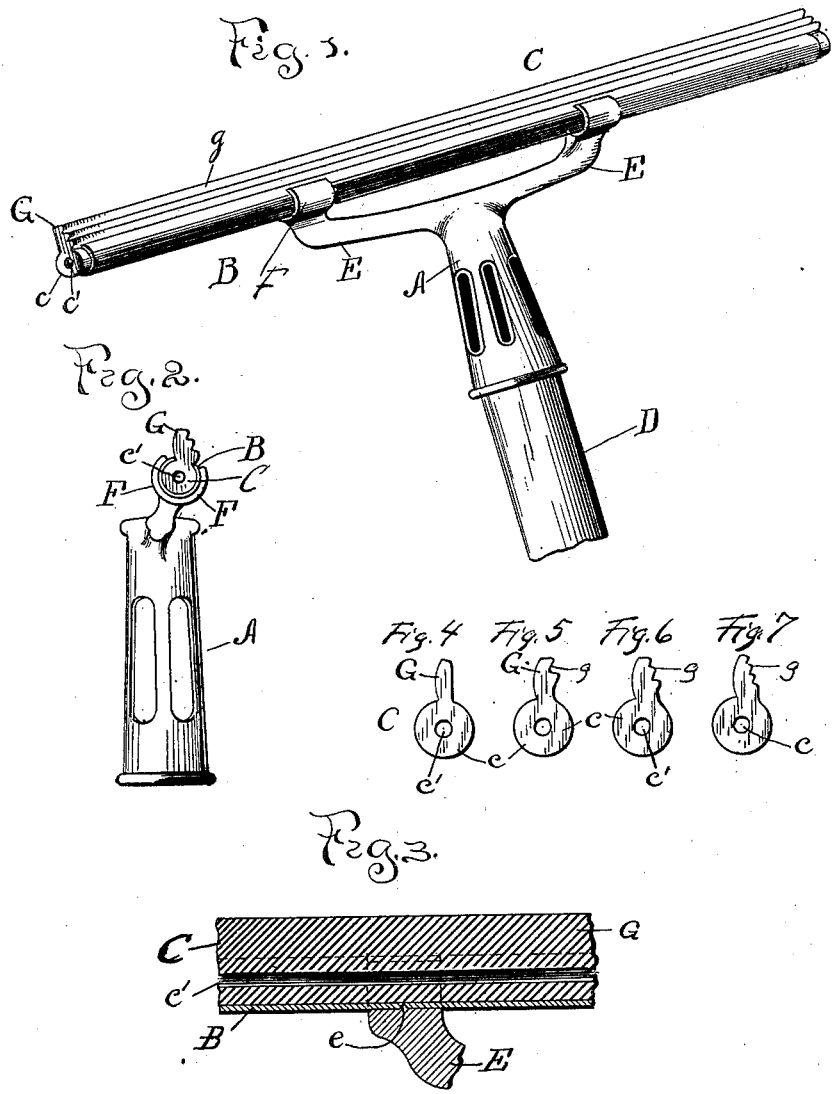
Witnesses:  
Inventor  
Paul R. Cumming  
By Raymond & Omohundro  
Att'ys

UNITED STATES PATENT OFFICE.

PAUL RUSSELL CUMMING, OF CHICAGO, ILLINOIS, ASSIGNOR TO HANDY THINGS COMPANY, OF SAME PLACE.

WINDOW-CLEANER.

SPECIFICATION forming part of Letters Patent No. 674,962, dated May 28, 1901.

Application filed August 17, 1899. Serial No. 727,477. (No model.)

*To all whom it may concern:*

Be it known that I, PAUL RUSSELL CUMMING, a citizen of the United States, residing at Chicago, in the county of Cook and State of Illinois, have invented certain new and useful Improvements in Window-Cleaners, of which the following is a specification.

My invention relates to certain new and useful improvements in window-cleaners; and one object is particularly to provide a simple and inexpensive device of this character which can be used without marring or scratching the window-frame and which is composed of the fewest number of parts combined and arranged to produce a device having superior advantages.

Another important object of the invention is to provide a rubber strip for window-cleaners having a round body and a projecting working lip or flange removably held in place in the holding device.

Another object is to construct the rubber strip in such a manner that it can be inserted in a tubular holder and afterward held tightly in place therein.

My invention also has in view to simplify the construction of devices of this character, to secure the rubber-strip holder rigidly in place, to provide a rubber strip which can be readily removed and replaced by another strip or reversed as to the direction of inclination of its working flange, and to accomplish other results, which will be pointed out hereinafter and specifically described in connection with the accompanying drawings, in which—

Figure 1 is a perspective view of a window-cleaner embodying my invention. Fig. 2 is an end elevation of the device. Fig. 3 is a detail longitudinal sectional view showing a portion of one of the socket-arms and holder. Figs. 4, 5, 6, and 7 are end elevations of rubber strips embodying my invention, showing different forms of longitudinal flange thereon.

Referring to the drawings, in which like letters of reference denote corresponding parts in all of the figures, my improved device comprises in the embodiment thereof illustrated in the drawings a socket-piece A, a holder B, supported by said socket-piece, and a rubber strip C, carried by the holder.

The socket-piece A may be made in any desired shape and of any suitable material, being adapted, however, to receive a pole D and having the spreading arms E, in which the holder is mounted. The ends of the arms have alined sockets formed thereon by the curved flanges F to receive the holder, and they can be pinched down upon the holder after the latter has been properly arranged therein to fasten and retain the holder rigidly on the socket-piece. As a further means for securing the holder immovably in the arms of the socket-piece I may provide lugs $e$ on the arms to enter openings or depressions in the holder, these openings or depressions being of such a character, however, that the inner surface of the holder will be maintained smooth and clear of any obstruction.

The holder is preferably made of split tubing, having a longitudinal opening throughout its length through which the flange or lip G of the rubber strip projects, and the holder is positioned in the arms of the socket-piece in such a way that the flange of the rubber strip will project therethrough at the proper inclination.

The rubber strip is formed with a circular body $c$, having a central longitudinal opening $c'$ extending throughout its length, this opening being provided to enable the strip to be more readily stretched, so that it can be inserted in the holder at one end and drawn through the same to its proper position, as shown in Fig. 1. The body of the strip is made of such diameter that it will fit snugly and tightly within the holder, and by providing the central opening therein the body can be, in effect, reduced in diameter by stretching sufficiently to permit of its ready insertion in the end of the holder and arrangement therein. I prefer to make the strip of somewhat greater length than the holder, so that it will project beyond the ends of the holder, thereby preventing the ends of the holder from scratching or scraping the window-frame when the device is in use.

The body of the rubber strip is provided with a longitudinal flange or lip G, which projects through the opening in the holder and is inclined in a position which will adapt it for its peculiar uses. This flange or lip may be made in a variety of different ways, some of which I have illustrated in the drawings. It may be provided on its working face with one, two, three, four, or more sharp or rounded longitudinal ribs $g$, as shown in the different figures, or it may be made without ribs, with one side straight and the other side curved, and a number of other different methods of making the lip may be employed without departing from the spirit or sacrificing the advantages of my invention. After the regular working face of the flange has been used for some time and become worn the rubber strip may be removed from the holder and reversed to bring the opposite side of the flange in position for use.

I am aware that the holder may be secured in the arms of the socket-piece in other ways than by the means herein described and that other changes in the details of construction of my invention may be made, and I would therefore have it understood that I reserve the right to make all such changes as come within the purview of my invention.

Having thus fully described my invention, what I claim, and desire to secure by Letters Patent, is—

1. A window-cleaner comprising a tubular holder having an opening throughout its length, and a tubular rubber strip removably secured in said holder and having a lip or flange integral therewith and projecting through the opening in the holder, substantially as described.

2. A window-cleaner comprising a socket-piece having spreading arms, a split tubular holder rigidly clamped in said arms and a tubular rubber strip having a longitudinal flange thereon, removably arranged in said holder, substantially as described.

3. A window-cleaner comprising a socket-piece having spreading arms, circular flanges on said arms, a tubular holder rigidly clamped in said flanges, and a tubular rubber strip fitting in said holder and having a longitudinal flange thereon, substantially as described.

4. A window-cleaner comprising a socket-piece having spreading arms, a tubular holder clamped in said arms, a projection on said arms adapted to enter an opening or depression in the holder to secure the same against lateral and longitudinal movement, and a tubular rubber strip fitting in said holder and having a longitudinal flange thereon, substantially as described.

PAUL RUSSELL CUMMING.

Witnesses:
C. L. WOOD,
MILTON C. ERBY.